July 30, 1940. A. J. WEATHERHEAD, JR 2,209,709
METHOD OF MAKING VALVES
Filed Dec. 10, 1937
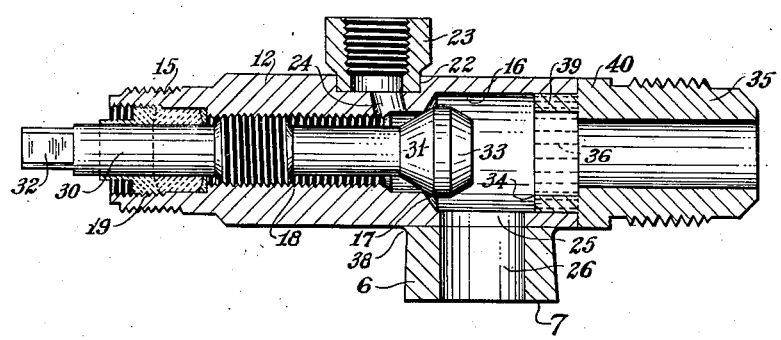
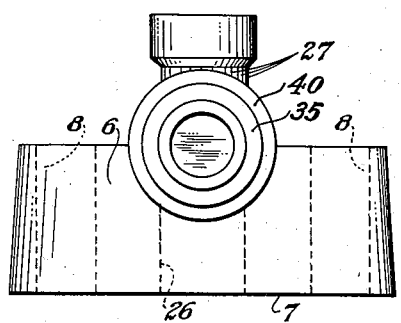
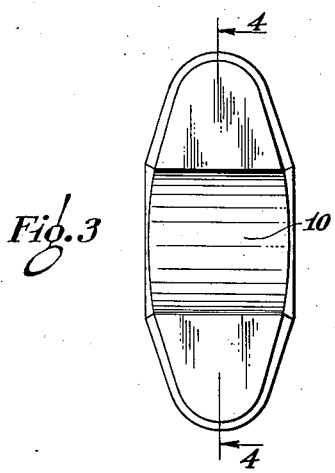 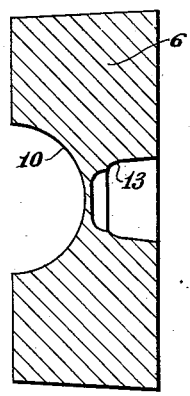
INVENTOR.
ALBERT J. WEATHERHEAD, JR.
BY
ATTORNEYS.

Patented July 30, 1940

2,209,709

UNITED STATES PATENT OFFICE 2,209,709

METHOD OF MAKING VALVES

Albert J. Weatherhead, Jr., Cleveland, Ohio, assignor to The Weatherhead Company, Cleveland, Ohio, a corporation of Ohio Application December 10, 1937, Serial No. 179,167

7 Claims. (Cl. 29—157.1)

This invention relates to valves and more particularly to a refrigerator valve assembly and the method of making the same.

It is among the objects of my invention to provide a valve and method of making the same in which the portions comprising the valve are secured to each other by copper brazing and said copper brazing effects certain desirable changes in the metallic characteristics of the various portions of the valve. It is a further object of my invention to provide a valve and method of making the same in accordance with the preceding object in which the valve portion forming the valve seat becomes relatively softer during the brazing process and the valve stem becomes relatively hardened during the brazing process. It is a further object of my invention to provide a valve in which a valve body is provided with a valve stem and the stem is irremovably enclosed within the valve body by a copper brazing process. It is a further object of my invention to provide a valve and method of making the same in accordance with the preceding object in which the metallic characteristics of both the valve body and valve stem are improved with respect to their functioning in the valve by the said copper brazing process. It is a further object of my invention to provide a valve and method of making same in which a ferrous metal supporting flange portion is arranged transversely with respect to a ferrous metal valve body and is secured thereto by a copper brazing process which in addition to firmly mounting the valve body on the flange forms a fluid tight bond between the flange and body. Other objects and advantages relating to simplicity of construction and economy of manufacture will appear, from the following specifications and the appended drawing wherein:

Figure 1 is a longitudinal sectional view of an assembled valve constructed according to my invention;

Figure 2 is an elevation of the assembled valve taken at right angles to the view of Figure 1;

Figure 3 is a plan view of the forged valve supporting flange;

Figure 4 is a section taken on the line 4—4 of Figure 3.

The valve of the present invention is particularly adapted for use in refrigerating systems where more or less corrosive refrigerants are employed, and it has heretofore been the practice to machine valves for this character of use from relatively large blocks of brass or other easily machined corrosion resisting metal. The valve of my invention comprises a relatively massive valve supporting flange 6 which is finished to have a smooth plane face as at 7 and a pair of bolt receiving apertures 8 to mount the face 7 against a refrigerator compressor unit. The supporting flange 6 is centrally provided as at 10 with a reentrant semi-cylindrical recess adapted to embrace the outer wall of the valve body 12. To reduce machining costs, effect marked savings in the quantity of material required to form the valve, and to provide a valve stronger and better suited to accomplish the functions for which it is designed, I prefer to form the valve body and the supporting flange separately and secure them together in an assembled relation as shown.

The flange supporting member 6 is preferably forged from a single billet of ferrous metal to the shape shown in Figures 3 and 4. During the forging the body receiving recess 10 is shaped as shown and a re-entrant recess 13 is formed opposite the saddle. The body portion 12 of the valve is preferably machined in an automatic screw machine from round rod stock, one end of the body being reduced and threaded exteriorly as at 15 to receive a valve stem cover cap. During the working on the automatic screw machine the body is drilled axially to provide an enlarged open end recess 16, a valve seat portion 17, a valve stem thread portion 18 and a stem packing nut receiving portion 19. I have shown the packing and packing nut in phantom outline inasmuch as this is conventional and forms no essential part of the present invention. The exterior of that portion of the valve body adjacent the valve seat 17 is drilled as at 22 to receive a fitting 23 and a conduit 24 is formed through the valve body to conduct fluid from the underside of the valve into the fitting 23. That portion of the valve body 12 above the valve seat 17 is apertured as at 25 and communicates with an aligned aperture 26 formed in the flange 6.

The enlarged axial bore 16 is adapted to be closed by a fluid conducting fitting 35 which ultimately becomes in effect a part of the body. The fitting 35 is preferably shouldered as at 40 and provided with a sleeve 39 which at its inner peripheral edge provides a valve seat 34. It will be observed that the valve stem 30 may be moved from the position shown in Figure 1 where the conical face 31 bears against the valve seat 17 to a position where the opposed conical face 33 may bear against the valve seat 34. In the latter described position it will be understood that a fluid passage will be maintained between the conduit 24 and 26 whereas in the position shown a fluid passage is provided between the fitting 35 and the conduit 26.

Subsequent to the machining of the valve body as above described the valve stem 30 is inserted through the enlarged open end 16 and the fitting 35 is then pressed into said open end. Preferably the fittings 23 and 35 are provided with a fine knurl throughout that area which is pressed into the valve body. This fine knurl indicated as at 27 on the fitting 23 and as at 36 on the fitting 35 performs two important functions during the making of a valve according to my invention. The first of these functions is to provide a secure pressed fit between the fittings and the body of the valve. The second of said functions is to provide minute troughs or conduits which will conduct through capillary attraction molten copper during the copper brazing process. It will be understood as the description proceeds that the fittings 23 and 35 are securely bonded to and become a part of the valve body by a copper alloy bond and that the fine knurling on the fittings insures that the molten copper will be conducted throughout the axial extent of the engagement between the fitting and the valve body 12. I have found that molten copper under the conditions which it is employed in my invention will ordinarily remain in a single globule on a smooth surface whereas when a surface is scored or knurled such as the cylindrical surfaces on the fittings 23 and 35, said molten copper will follow such knurling and evenly distribute the same.

Referring again to the materials of which my valve is constructed the valve body 12 and parts 23 and 35 are preferably formed of easily machinable round ferrous rod stock such as is ordinarily identified in the art as a high sulphur screw stock. A typical analysis of such stock may be:

|  | Per cent |
|---|---|
| Carbon | .08 to .16 |
| Manganese | .60 to .90 |
| Sulphur | .20 to .30 |
| Phosphorus | .09 to .13 |

This material is ordinarily characterized by a hardness of about 94-B on the Rockwell scale. The valve stem 30 is preferably formed of a stainless steel which may have a composition of about .10 carbon, 14.00 chromium and .30 sulphur, and is ordinarily characterized by a hardness of about 90-B on the Rockwell scale.

By reference to the hardness characteristics of the stem and the valve body above described it will be observed that the valve seats 17 and 34 being harder than the stem would tend to score or scratch the stem upon adjustment of the valve stem 30. This condition would adversely effect the seating of the valve and would be an undesirable arrangement of valve stem and valve seat materials.

Subsequent to the assembly of the valve stem within the body and of the members 23 and 35, the flange portion 6 may be secured in the assembled position shown by spot welding or the like as at 38. This valve assembly is then provided with a supply of free copper and the entire assembly carried through a brazing furnace constructed to maintain a temperature of about 2060° F. and a reducing atmosphere. The free copper may be in the form of fine copper wire placed adjacent the juncture of parts 23, 39 and 6 with the body, or the copper may be in the form of finely divided particles applied to the fitting in a lacquer or the like. I have found that the parts 23, 35 and 6 may be successfully copper brazed to the valve body 12 by conducting the assembly through the furnace in a manner which will raise the temperature thereof from room temperature to about 2060° F. at an average rate of about 400° per minute. From the copper brazing furnace the brazed assembly is cooled to about 160° F. at an average rate of about 55° per minute.

In addition to effectively bonding the parts of the valve to each other by the copper brazing furnace as above described I have found that important desirable changes are effected in the material of the stem and body. One change effected by the copper brazing is a change in the hardness of the stem and valve body including the valve seats 17 and 34. The copper brazing as carried out above reduces the hardness of the valve seat portions 17 and 34 to about 68-B on the Rockwell scale and simultaneously the hardness of the stem 30 is raised to about 100-B on the Rockwell scale. Thus whereas prior to copper brazing the seat 17 was harder than the stem, the stem now exceeds the seat in hardness by about 32 on the Rockwell B scale. This change in the hardness of the metal means that the seat 17 will not scratch or gouge the conical face 31 of the stem and means that a desirable valve facing and seal will be effected. The stem will be sufficiently hardened and the seats sufficiently softened due to the heat maintained for brazing so that the stem will smooth out any irregularities which may be formed in the seat and will form its own seat so that a fluid pressure tight seal will result.

The stem is also strengthened by the heat treatment so that its ability to resist deformation by a wrench or key in the portion 32 and resist torsional strains are increased. I have found that a stainless steel stem as above described will not warp or distort the threads thereon during the temperatures existing in the brazing furnace and thus a stem of this type is well suited to complete assembly with the valve prior to the copper brazing.

Following the copper brazing the entire assembly may be cadmium or tin plated to resist the corrosive effects of such refrigerants as may be conducted through the valve. In connection with the plating process I have found that the valve stem is substantially uneffected by the plating and the conical valve faces 31 and 33 present clean hard plating free surfaces to the valve seats 17 and 34 respectively.

As a modification of the above described method of making a valve, the fitting 23, the valve body 12 and the flange 6 may be first assembled and copper brazed to each other in a brazing furnace prior to the drilling of the aperture 24 or similarly machining operations. The apertures 24, 25 and 26 may be drilled subsequent to the first brazing operation and the valve stem 30 then inserted in the end of the valve body closed by fitting 35. This complete assembly may thereafter be passed through the brazing furnace in the manner described to bond the fitting 35 to the valve body and accomplish the hardening of the stem and the softening of the seats 17 and 34 in the manner described in connection with the preferred embodiment.

Although I have described a preferred form of my invention and a modification thereof in considerable detail, it will be understood by those skilled in the art that variations may be made therein without departing from the scope of the invention as defined in the following claims.

I claim:

1. That method of making a valve which comprises assembling a multi-part valve body of material having one hardness characteristic with a valve stem having a different hardness characteristic and thereafter brazing the parts of the body to each other under temperature conditions effective to decrease the hardness characteristic of the valve body and increase the hardness characteristic of the valve stem.

2. That method of making a valve which comprises forming a valve body of high sulphur screw stock and assembling therein a valve stem made of stainless steel, temporarily affixing a conduit fitting to said valve body and thereafter permanently copper brazing said conduit to the body under temperature conditions effective to soften the valve body and harden the valve stem.

3. That method of making a valve which comprises forming one valve body part with an axial bore to receive a valve stem and an enlarged bore adjacent one end to provide a valve seat, threading a valve stem within said axial bore having an enlarged head thereon to co-operate with said valve seat, forming a second valve body part with a sleeve extending within said enlarged bore to provide a second valve seat and prevent removal of said valve stem from the two part valve body, thereafter heating the assembly of valve body parts and valve stem in a furnace in the presence of copper to copper braze said valve body parts to each other and simultaneously soften said valve seats and harden said valve stem.

4. That method of making a two-way valve which includes forming an axial bore through a first valve body portion made of high sulphur screw stock to receive a valve stem and provide a valve seat and valve head recess, forming a second valve body portion of high sulphur screw stock to fit within said recess and provide a second valve seat, arranging a valve stem made of high chromium content steel within said body with an enlarged head portion adapted to co-operate with said two seats, telescopically arranging said second valve body portion within the first named body portion and brazing said assembly in a furnace in the presence of free copper under temperature conditions effective to soften said two body portions and harden said stem and head portion.

5. That method of making a valve which comprises assembling a multi-part valve body of material having one hardness characteristic with a valve stem having a different hardness characteristic and thereafter brazing the parts of the body to each other with the stem in place under temperature conditions effective to change the relative hardness characteristics of the valve body and the valve stem.

6. That method of making a valve which comprises forming a valve body of a ferrous material and assembling therein a valve stem made of another ferrous material, and thereafter permanently copper brazing a fitting to the body under temperature conditions effective to soften the valve body and harden the valve stem.

7. That method of making a valve which comprises forming one valve body part with an axial bore to receive a valve stem and an enlarged bore adjacent one end to provide a valve seat, threading a valve stem within said axial bore having an enlarged head thereon to co-operate with said valve seat, forming a second valve body part with a sleeve extending within said enlarged bore to provide a second valve seat and prevent removal of said valve stem from the two part valve body, the valve body material having one hardness characteristic and the valve stem having a different hardness characteristic, supplying a brazing metal to the contacting surfaces of said body parts, thereafter brazing the said body parts together and changing the hardness characteristics of said body parts and said stem to decrease the hardness characteristic of the valve body and increase the hardness characteristic of the valve stem by conducting the assembly of valve body parts and valve stem through a furnace having a reducing atmosphere and which raises the temperature of the parts and stem from room temperature to about 2000° F. at an average rate of about 400° per minute and thereafter cooling the assembly of valve parts and stem at an average rate of about 55° per minute.

ALBERT J. WEATHERHEAD, Jr.